United States Patent
Yamashita et al.

(10) Patent No.: US 7,724,426 B2
(45) Date of Patent: May 25, 2010

(54) LASER SCANNING MICROSCOPE AND MICROSCOPIC OBSERVING METHOD

(75) Inventors: Yusuke Yamashita, Hachioji (JP); Akinori Araya, Yokohama (JP)

(73) Assignee: Olympus Corporation, Tokyo (JP)

( * ) Notice: Subject to any disclaimer, the term of this patent is extended or adjusted under 35 U.S.C. 154(b) by 336 days.

(21) Appl. No.: 11/805,874

(22) Filed: May 24, 2007

(65) Prior Publication Data

US 2007/0272885 A1 Nov. 29, 2007

(30) Foreign Application Priority Data

May 29, 2006 (JP) .............................. 2006-148258

(51) Int. Cl.
*G02B 21/06* (2006.01)
*G02F 1/33* (2006.01)

(52) U.S. Cl. ...................................... 359/368; 359/305

(58) Field of Classification Search ......... 359/305–314, 359/368, 385

See application file for complete search history.

(56) References Cited

U.S. PATENT DOCUMENTS

| | | | | |
|---|---|---|---|---|
| 4,872,746 A | * | 10/1989 | Kobayashi | 359/312 |
| 5,355,252 A | * | 10/1994 | Haraguchi | 359/369 |
| 6,094,300 A | * | 7/2000 | Kashima et al. | 359/385 |
| 6,587,255 B2 | * | 7/2003 | Davidson et al. | 359/314 |
| 7,180,661 B2 | * | 2/2007 | Sasaki | 359/385 |
| 7,227,127 B2 | | 6/2007 | Saggau et al. | |
| 2003/0123144 A1 | * | 7/2003 | Knebel | 359/385 |
| 2005/0012993 A1 | * | 1/2005 | Araya | 359/385 |
| 2005/0263690 A1 | * | 12/2005 | Araya et al. | 250/234 |
| 2006/0071143 A1 | * | 4/2006 | Saggau et al. | 250/201.3 |
| 2007/0201123 A1 | | 8/2007 | Saggau et al. | |

FOREIGN PATENT DOCUMENTS

| | | |
|---|---|---|
| JP | 10-206742 A | 8/1998 |
| JP | 11218682 A * | 8/1999 |
| WO | WO 2006/042130 A2 | 4/2006 |

\* cited by examiner

*Primary Examiner*—Alessandro Amari
*Assistant Examiner*—Mark Consilvio
(74) *Attorney, Agent, or Firm*—Frishauf, Holtz, Goodman & Chick, P.C.

(57) ABSTRACT

To provide a laser scanning microscope including a laser beam source for stimulation that emits a laser beam for stimulation for applying photostimulation to a sample, a scanner that performs scanning with the laser beam for stimulation, a control device that controls the scanner, and an objective lens that condenses the laser beam for stimulation used for scanning by the scanner to the sample. The scanner has at least one acoustooptic device arranged on an optical path of the laser beam for stimulation. The control device determines a plurality of frequencies on the basis of the position and the range of a photostimulation region, and simultaneously applies the high-frequency signals of the determined plurality of frequencies to a vibrator attached to the acoustooptic device.

24 Claims, 12 Drawing Sheets

LASER SCANNING MICROSCOPE AND MICROSCOPIC OBSERVING METHOD

BACKGROUND OF THE INVENTION

1. Field of the Invention

The present invention relates to a laser scanning microscope. In particular, the present invention relates to a laser scanning microscope and a microscopic observing method for scanning a laser beam for stimulation with an acoustooptical effect.

This application is based on Japanese Patent Application No. 2006-148258, the content of which is incorporated herein by reference.

2. Description of Related Art

Conventionally, a laser scanning microscope having a scanning optical system for observation that observes a sample and a scanning optical system for stimulation that applies photostimulation to a sample is well known (e.g., refer to Japanese Unexamined Patent Application Publication No. Hei 10-206742).

With this laser scanning microscope, a laser beam for stimulation emitted from a laser beam source for stimulation is two-dimensionally scanned by a scanner using a galvano mirror, and is emitted to the sample, thereby applying photostimulation to a photostimulation region.

Preferably, this photostimulation is simultaneously applied to the entire photostimulation region. However, with this conventional laser scanning microscope, the sample is two-dimensionally scanned with the laser beam for stimulation by the galvano mirror for photostimulation and it takes some time from the start of photostimulation to the end.

BRIEF SUMMARY OF THE INVENTION

The present invention provides a laser scanning microscope that can reduce a photostimulation execution time from the start of photostimulation to the end at a photostimulation region.

According to a first aspect of the present invention, a laser scanning microscope emits a laser beam for observation for observing a sample placed on a stage in a manner such that the laser beam two-dimensionally scans the sample, detects a light emitted from the sample, and forms a fluorescent image. The laser scanning microscope comprises: a laser beam source for stimulation that emits a laser beam for stimulation for supplying photostimulation to the sample; a scanning unit for stimulation that performs scanning with the laser beam for stimulation; a control unit that controls the scanning unit for stimulation; and an objective lens that condenses the laser beam for stimulation used for scanning by the scanning unit for stimulation and emits the laser beam to the sample. The scanning unit for stimulation comprises at least one acoustooptic device arranged on an optical path of the laser beam for stimulation, and the control unit determines a plurality of frequencies on the basis of the position and range of a region for photostimulation, and simultaneously applies high-frequency signals of the determined plurality of frequencies to a vibrator attached to the acoustooptic device, thereby simultaneously emitting the laser beam for stimulation to the region.

With this structure, the scanning is performed with the laser beam for stimulation emitted from the laser beam source for stimulation by the acoustooptic device provided for the scanning unit for stimulation, and the laser beam for stimulation is emitted to the sample via the objective lens. In this case, high-frequency signals with a plurality of frequencies determined on the position and range of the photostimulation region are simultaneously applied from the control unit to the vibrator attached to the acoustooptic device.

Upon simultaneously applying the high-frequency signals with a plurality of frequencies to the vibrator, the laser beam for stimulation incident on the acoustooptic device is simultaneously diffracted at diffractive angles corresponding to the frequencies of the high-frequency signals, thereby outputting the laser beam as a plurality of spot beams aligned in one direction. Herein, as the frequency interval of the high-frequency signals applied to the vibrator is narrower, the distance between the spot beams aligned in one direction also becomes narrower. As a consequence, by adjusting the frequency interval of the high-frequency signals, the interval between the spot beams can be controlled. Further, the frequency interval is narrow to some degree, thereby providing a superposing portion of the spot beams aligned in one direction. The laser beam like a line can be generated.

According to the present invention, a plurality of spot beams is simultaneously emitted to the sample, thereby effectively performing the photostimulation as compared with the two-dimensional scanning of single-spot beams.

In the laser scanning microscope, the scanning unit for stimulation may comprise: a first acoustooptic device that diffracts the incident laser beam for stimulation in a first direction; and a second acoustooptic device that diffracts the incident laser beam for stimulation in a direction intersecting with the first direction.

With this structure, the laser beam for stimulation emitted from the laser beam for stimulation is diffracted by the first and second acoustooptic devices in the first direction and the direction intersecting with the first direction, i.e., in the horizontal direction and in the vertical direction. As a consequence, upon simultaneously applying high-frequency signals with a plurality of frequencies to the vibrators attached to the first and second acoustooptic devices, the laser beam having the two-dimensional distribution can be generated. Thus, the laser beam is simultaneously emitted to the two-dimensional region, thereby further effectively the photostimulation.

In the laser scanning microscope, high-frequency signals of a plurality of frequencies may be simultaneously applied to the vibrators of the first acoustooptic device and the second acoustooptic device, thereby simultaneously emitting the laser beam for stimulation to a two-dimensional region on the sample.

In the laser scanning microscope, the two-dimensional region to which the laser beam for stimulation is emitted is rectangular.

In the laser scanning microscope, high-frequency signals of a plurality of frequencies may be simultaneously applied to one of the vibrators of the first acoustooptic device and the second acoustooptic device, thereby simultaneously emitting the laser beam for stimulation to a region on a line on the sample.

In the laser scanning microscope, the region on one line to which the laser beam for stimulation is emitted corresponds to a line segment with a predetermined length.

In the laser scanning microscope, high-frequency signals of a plurality of frequencies may be simultaneously applied to one of the vibrators of the first acoustooptic device and the second acoustooptic device, a high-frequency signal of at least one frequency that changes with time may be applied to the other vibrator to switch an emission region of light like a line emitted from the acoustooptic device driven by the one vibrator by an acoustooptic device that driven by the other vibrator, thereby emitting the laser beam for stimulation to a two-dimensional region on the sample.

In the laser scanning microscope, the frequency of the high-frequency signal applied to the one vibrator may be changed with time.

In the laser scanning microscope, the two-dimensional region on the sample to which the laser beam for stimulation is emitted is, e.g., circular.

In the laser scanning microscope, the scanning unit for stimulation may comprise an acoustooptic device that diffracts the incident laser beam for stimulation in the horizontal direction or in the vertical direction, and a scanning mirror that scans the incident laser beam for stimulation in the direction orthogonal to the diffractive direction of the acoustooptic device.

With this structure, the acoustooptic device can set the laser beam for stimulation serving as the spot beams as a plurality of spot beams aligned in one direction (if the frequency interval of the high-frequencies is narrow to some degree, the laser beam like a line can be obtained). Further, the scanning can be performed by the scanning mirror with the laser beam for photostimulation in the direction orthogonal to the one direction. Thus, the sample can be scanned with a plurality of spot beams in the direction orthogonal to the alignment. As a consequence, the photostimulation can be effectively executed. Further, by changing the frequency of the high-frequency signal applied to the vibrator attached to the acoustooptic device in accordance with the shape of the photostimulation region, the photostimulation can be effectively executed even to various shapes including circle and ellipse as well as square.

In the laser scanning microscope, high-frequency signals with a plurality of frequencies may be simultaneously applied to the vibrator of the acoustooptic device and the laser beam for stimulation may be simultaneously emitted to a region like a line on the sample. The region like a line corresponds to, e.g., a line segment with a predetermined length.

In the laser scanning microscope, the high-frequency signal with a plurality of frequencies may be simultaneously applied to the vibrator of the acoustooptic device and the scanning mirror may scan the emission position at the region like a line, simultaneously emitted by the acoustooptic device, thereby emitting the laser beam for stimulation to the two-dimensional region on the sample.

In the laser scanning microscope, the frequency of the high-frequency signal applied to the vibrator may be changed with time.

In the laser scanning microscope, the two-dimensional region to which the laser beam for stimulation are emitted on the sample is, e.g., circular.

In the laser scanning microscope, the control unit may determine the frequency of the high-frequency signal in view of a wavelength of the laser beam for stimulation.

With this structure, the frequency of the high-frequency signal is determined depending on the wavelength of the laser beam for stimulation. As a consequence, even if the wavelength of the laser beam for stimulation is switched, the incident light can be diffracted at a desired diffractive angle and constant scanning precision can be kept.

In the laser scanning microscope, the control unit may correct the amplitude of the high-frequency signal in accordance with characteristics of a diffractive angle of the intensity of diffraction light of the acoustooptic device.

With this structure, the amplitude of the high-frequency signal is corrected in accordance with the characteristics of the diffractive angle of the intensity of diffraction light of the acoustooptic device, thereby controlling, to a desired intensity, the light intensity of the laser beam for stimulation emitted from the acoustooptic device. As a consequence, throughout the entire photostimulation region, the light intensity of the laser beam for stimulation can be uniform. Alternatively, the light intensity of the laser beam for stimulation can be partly varied.

The laser scanning microscope may further comprise a scanning unit that scans the sample with a laser beam for observation.

In the laser scanning microscope, the region to which the laser beam for stimulation is emitted can be designated on an image previously-obtained by the emission of the laser beam for observation.

In the laser scanning microscope, the interval of a plurality of frequencies of the high-frequency signals may be narrower than a predetermined value, thereby spatially continuing the region for simultaneously emitting the laser beam for stimulation.

In the laser scanning microscope, the control unit may simultaneously apply high-frequency signals having different amplitudes depending on the determined plurality of frequencies to the vibrator, thereby differing the emission intensity of the laser beam for stimulation every region.

According to a second aspect of the present invention, a microscopic observing method for emitting a laser beam for observation for observing a sample placed on a stage in a manner such that the laser beam two-dimensionally scans the sample, detecting a light emitted from the sample, and forming a fluorescent image, comprises the steps of: arranging at least one acoustooptic device on an optical path of laser beams for stimulation; and simultaneously applying high-frequency signals of a plurality of frequencies determined depending on a position and a range of a photostimulation region to a vibrator attached to the acoustooptic device.

With this structure, the acoustooptic device provided for the scanning unit for stimulation performs scanning with the laser beam for stimulation emitted from the source of the laser beam for stimulation, and the laser beam is emitted to the sample via an objective lens. In this case, high-frequency signals with one or a plurality of frequencies determined on the basis of the position and range of the photostimulation region are simultaneously applied to the vibrator attached to the acoustooptic device.

Upon simultaneously applying the high-frequency signals with a plurality of frequencies to the vibrator, the laser beam for stimulation incident on the acoustooptic device is simultaneously diffracted at diffractive angles corresponding to the frequencies of the high-frequency signals, thereby emitting the laser beam as a plurality of spot beams aligned in one direction. Herein, as the frequency interval of the high-frequency signal applied to the vibrator is narrower, the distance between the spot beams aligned in one line also becomes narrower. As a consequence, by adjusting the frequency interval of the high-frequency signal, the interval between the spot beams can be controlled. Further, the frequency interval is narrow to some degree, thereby providing a superposing portion of the spot beams aligned in one line. Furthermore, the laser beam like a line can be generated.

According to the present invention, a plurality of spot beams can be simultaneously emitted to the sample, thereby efficiently performing the photostimulation as compared with the two-dimensional scanning of single-spot beams.

A third aspect of the present invention provides a computer-readable storage medium storing a photostimulation control program for controlling a scanning optical system for stimulation with a laser scanning microscope, the laser scanning microscope having a scanning optical system for observation that two-dimensionally scans a sample placed on a state with a laser beam for observation for observing the sample and an optical detecting unit that detects light emitted from the sample, and the scanning optical system for stimulation that applies photostimulation to the sample, the scanning optical system for stimulation having at least one acoustooptic device, the photostimulation control program for enabling a computer to execute: processing that sets a diffraction range of the acoustooptic device in accordance with a position and a range of a photostimulation region; processing that obtains one or a plurality of frequencies corresponding to the diffraction range; and processing that simultaneously applies a high-frequency signal of the one or the plurality of frequencies corresponding to the diffraction range to a vibrator attached to the acoustooptic device.

This photostimulation control program is executed by hardware resources, thereby setting the diffractive range of the acoustooptic device in accordance with the position and range of the photostimulation region. Further, one or a plurality of frequencies corresponding to the diffractive range is calculated, and the high-frequency signal with the one or plurality of frequencies is simultaneously applied to the vibrator attached to the acoustooptic device. As a consequence, the laser beam for stimulation incident on the acoustooptic device is simultaneously diffracted at diffractive angles of the high-frequency signals. Thus, it is possible to emit, to the sample, a plurality of spot laser beams aligned in one direction, the laser beam for stimulation like a line depending on the frequency interval between the high-frequency signals, or the laser beam for stimulation used for high-speed scanning with the acoustooptical effect. Thus, the photostimulation can be efficiently performed.

According to the present invention, advantageously, it is possible to reduce the photostimulation execution time from the start of photostimulation to the end at the photostimulation region.

DETAILED DESCRIPTION OF THE INVENTION

Hereinbelow, a description will be given of a laser scanning microscope according to an embodiment of the present invention with reference to the drawings.

First Embodiment

Figure 1:
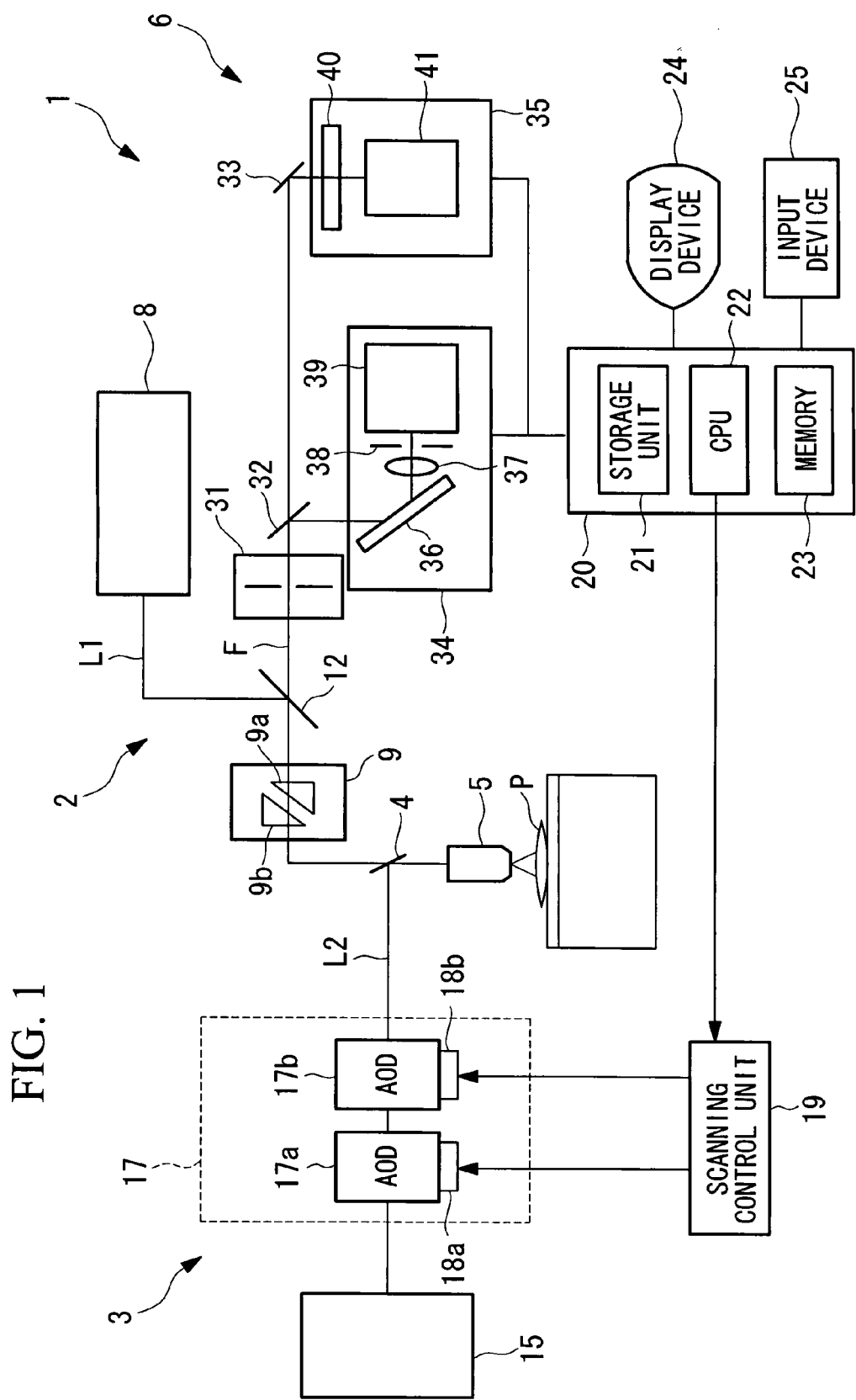
FIG. 1 is a diagram showing the entire structure showing a laser scanning microscope according to the first embodiment of the present invention.

Referring to FIG. 1, a laser scanning microscope according to the first embodiment is a laser scanning confocal microscope. As shown in FIG. 1, optical parts such as various lenses and a pinhole are omitted for the purpose of a brief description.

Referring to FIG. 1, a laser scanning microscope 1 according to the first embodiment of the present invention comprises: a scanning optical system 2 for observation that performs scanning with a laser beam L1 for observation; a scanning optical system 3 for stimulation that performs scanning of a laser beam L2 for stimulation; a dichroic mirror 4 that combines waves of the laser beam L1 for observation and the laser beam L2 for stimulation; an objective lens 5 that collects the wave-combined laser beam L1 for observation and the laser beam L2 for stimulation, emits the collected the laser beam L1 for observation and the laser beam L2 for stimulation to a sample P, condenses fluorescent light F generated by exciting a fluorescent material in the sample P; and an optical detector 6 that detects the fluorescent light F condensed by the objective lens 5.

The scanning optical system 2 for observation comprises: a laser beam source 8 for observation that emits the laser beam L1 for observation; and a first scanner 9 that two-dimensionally scans the sample P in the direction intersecting with the optical axis with the laser beam L1 for observation emitted from the laser beam source 8 for observation.

Between the laser beam source 8 for observation and the first scanner 9 in the scanning optical system 2 for observation, a dichroic mirror 12 is arranged to branch from the laser beam L1 for observation and direct to the optical detector 6, the fluorescent light F that is generated at the sample P, is condensed by the objective lens 5, and is returned via the dichroic mirror 4 and the first scanner 9.

The first scanner 9 is a so-called proximal galvano mirror having a first galvanic mirror 9a that scans the sample P with the laser beam L1 for observation in the horizontal direction corresponding to the left and right direction of a fluorescent image, which will be described later, and a second galvanic mirror 9b that scans the sample P with the laser beam L1 for observation in the vertical direction corresponding to the up and down direction of the fluorescent image. Thus, the sample P is two-dimensionally scanned with the laser beam L1 for observation by raster scanning system.

The scanning optical system 3 for stimulation comprises: a laser beam source 15 for stimulation that emits the laser beam L2 for stimulation; and a second scanner (scanning unit for stimulation) 17 that two-dimensionally scans the sample P in the direction intersecting with the optical axis with the laser beam L2 for stimulation emitted from the laser beam source 15 for stimulation. The scanning optical system 3 for stimulation will be described in details later.

The optical detector 6 comprises a confocal pin hole 31, dichroic mirrors 32 and 33, a first optical detector unit 34, and a second optical detector unit 35.

The first optical detector unit 34 comprises a distribution element 36, a lens 37, a slit 38, and a photoelectrically converting element 39. Further, the second optical detector unit 35 comprises a light measurement filter 40 and a photoelectrically converting element 41. According to the first embodiment, a planar diffractive grid is used as the distribution element 36, and the planar diffractive grid is rotated, thereby selecting the center of a wavelength band to be detected. The light measurement filter 40 has characteristics for transmitting only light with a specific wavelength.

The photoelectrically converting elements 39 and 41 are connected to a control device 20 via an A/D converter (not shown). The control device 20 comprises a storage unit 21, a CPU 22, and a memory 23. The control device 20 may comprise a so-called personal computer. The CPU 22 reads various data and various programs stored in the storage unit 21 to the memory 23, and executes information processing and calculating processing, thereby realizing various control contents. The storage unit 21 is, e.g., an HD (Hard Disc) or ROM (Read Only Memory). The memory 23 is, e.g., a RAM (Random Access Memory).

The CPU 22 forms a two-dimensional fluorescent image on the basis of scanning position information on the sample P with the laser beam L1 for observation using the first scanner 9 and light intensity information of the fluorescent light F detected by the optical detector 6, and displays the fluorescent image on a display device 24.

Further, an input device 25 is connected to the control device 20. The input device 25 is used for various input operations of an operator.

In the scanning optical system 3 for stimulation, the second scanner 17 comprises: a first acoustooptic device 17a that diffracts the laser beam L2 for stimulation in the horizontal direction corresponding to the left and right direction of the fluorescent image, which will be described later; and a second acoustooptic device 17b that diffracts the laser beam L2 for stimulation in the vertical direction corresponding to the up and down direction of the fluorescent image.

According to the first embodiment, the first acoustooptic device 17a and the second acoustooptic device 17b are acousto-optical deflectors (AODs).

Vibrators (vibration supply units) 18a and 18b that are driven by a high-frequency signal applied by a scanning control unit 19, which will be described later, are attached to the acoustooptic devices 17a and 17b.

The scanning control unit 19 is connected to the control device 20, and applies the high-frequency signal within a frequency band corresponding to signal control information from the control device 20 to the vibrators 18a and 18b.

The storage unit 21 in the control device 20 stores a corresponding relationship between first diffractive angles θ and frequencies f of the acoustooptic devices 17a and 17b. For example, the scanning control unit 19 stores a relational expression shown by the following Expression (1).

$$\theta = \lambda \cdot f / Va \qquad (1)$$

Figure 2:
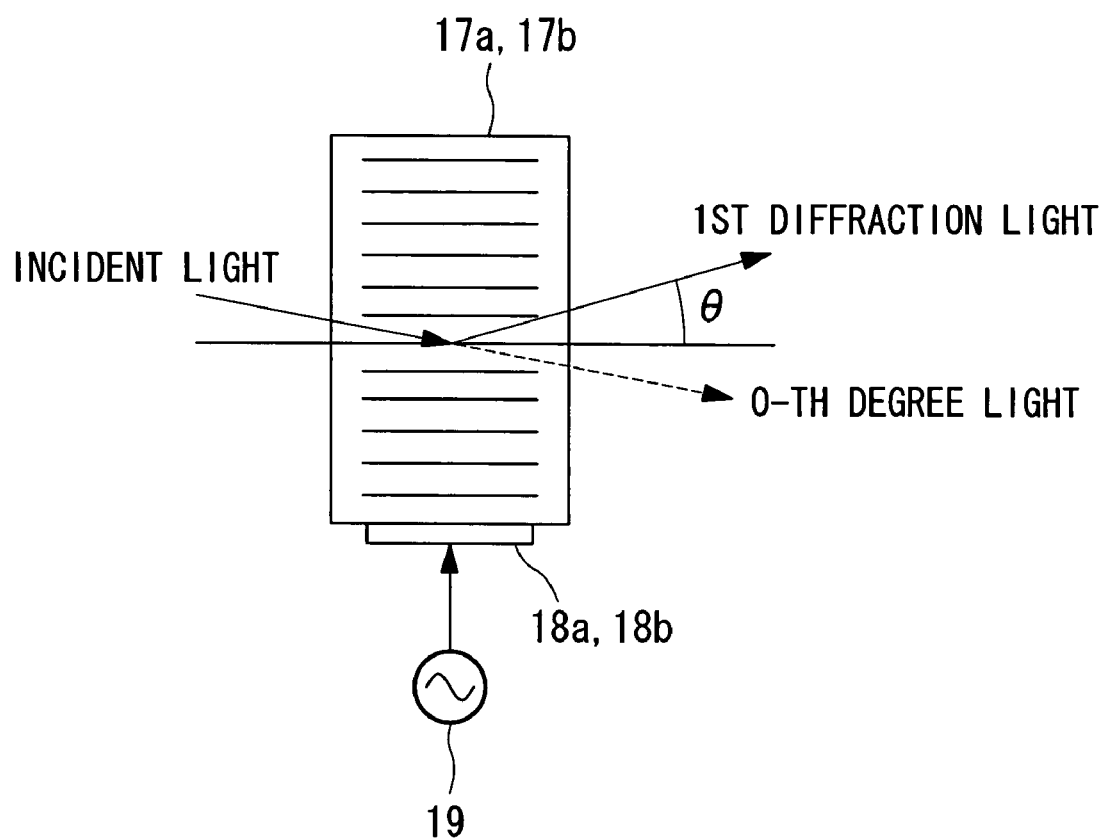
FIG. 2 is an illustrative diagram of the operation of an acoustooptic device shown in FIG. 1.

In Expression (1), reference numeral θ denotes an angle formed by reference line of the acoustooptic devices 17a and 17b and the first diffraction light (hereinafter, referred to as a "diffractive angle") as shown in FIG. 2, reference numeral λ denotes a wavelength of the laser beam L2 for stimulation, reference numeral f denotes a frequency of the high-frequency signal applied to the vibrators, and reference numeral Va denotes an acoustic velocity in crystal in the acoustooptic devices 17a and 17b. The acoustic velocity Va has a value varied depending on the individual acoustooptic devices 17a and 17b.

Further, the control device 20 stores the pixel position of the fluorescent image displayed on the display device 24 and the diffractive angle θ in the acoustooptic devices 17a and 17b with a corresponding relationship therebetween. As a consequence, upon designating a photostimulation region on the fluorescent image displayed on the display device 24 by the operator, the CPU 22 determines the rage of the diffractive angle θ of the acoustooptic devices 17a and 17b so that the laser beam L2 for stimulation is emitted to the photostimulation region, thereby simultaneously applying the high-frequency signals with a plurality of frequencies corresponding to the range of the diffractive angle θ to the vibrators 18a and 18b via the scanning control unit 19.

Figure 3:
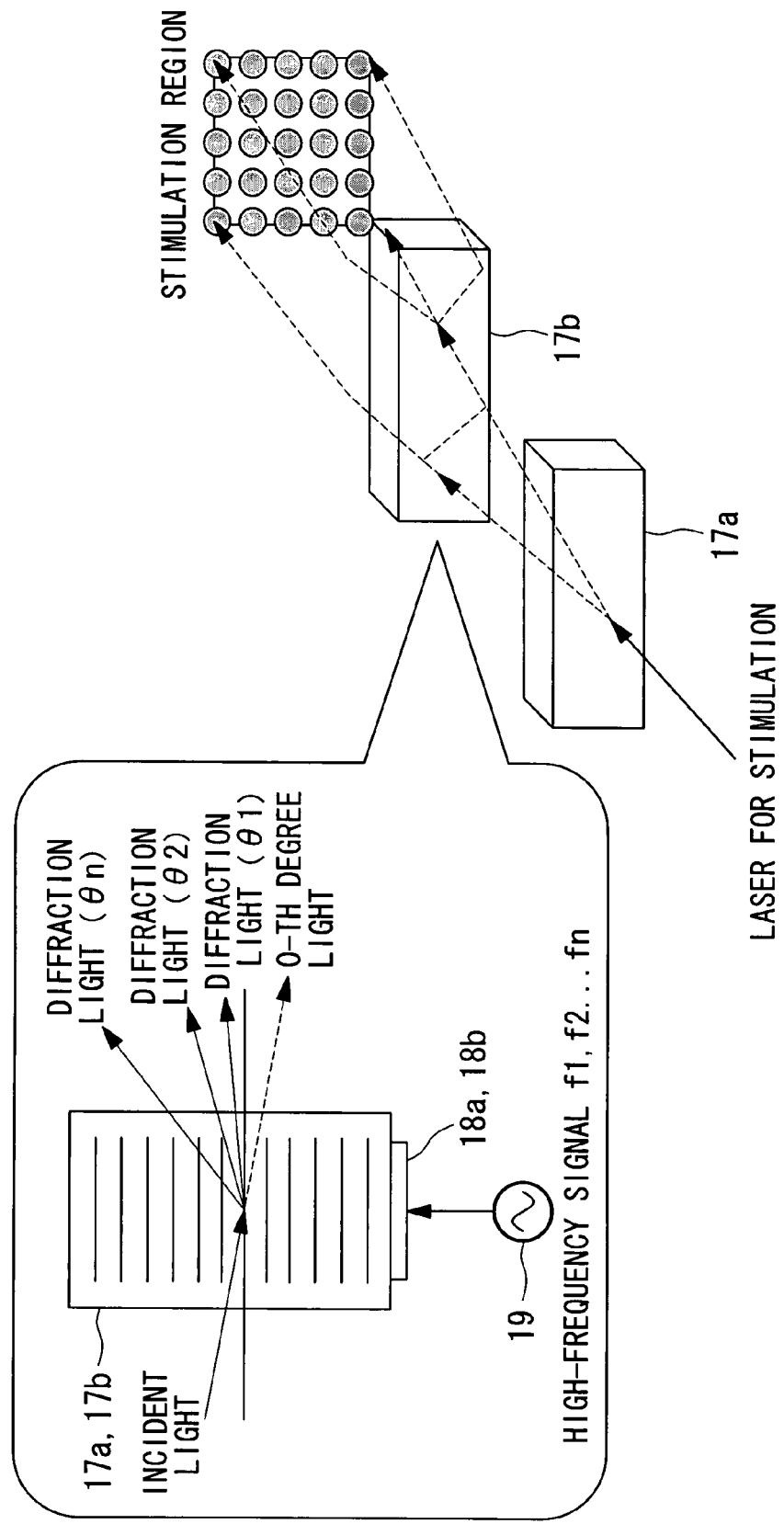
FIG. 3 is an illustrative diagram of the operation of a second scanner shown in FIG. 1.

As a consequence, the change in index of refraction corresponding to vibrations of the vibrators 18a and 18b is caused in the first and second acoustooptic devices 17a and 17b. As shown in FIG. 3, the laser beam L2 for stimulation incident on the first acoustooptic device 17a is simultaneously diffracted at different diffractive angles in the horizontal direction, thereby generating a plurality of spot beams aligned in the horizontal direction, that is, spot beams having the one-dimensional distribution. Incidentally, as the frequency interval of the high-frequency applied to the vibrator 18a is narrower, the distance between the spot beams is shorter. Therefore, the frequency interval between the high-frequency signals are narrower than one constant value, and the spot beams adjacent thereto thus have a superposing portion and can be the laser beam L2 like a line, extended in the horizontal direction. Incidentally, the following second acoustooptic device 17b will be similar thereto.

Further, a plurality of spot beams aligned in the horizontal direction are simultaneously diffracted in the vertical direction at a plurality of diffractive angles by the second acoustooptic device 17b, thereby obtaining spot beams having the two-dimensional distribution.

Photostimulation Region; Square

Hereinbelow, a description will be given of the operation of the laser scanning microscope 1 with the above-mentioned structure according to the first embodiment. Herein, a description will be given of the case of designating "square" as a photostimulation region B, which will be described later.

Figure 4:
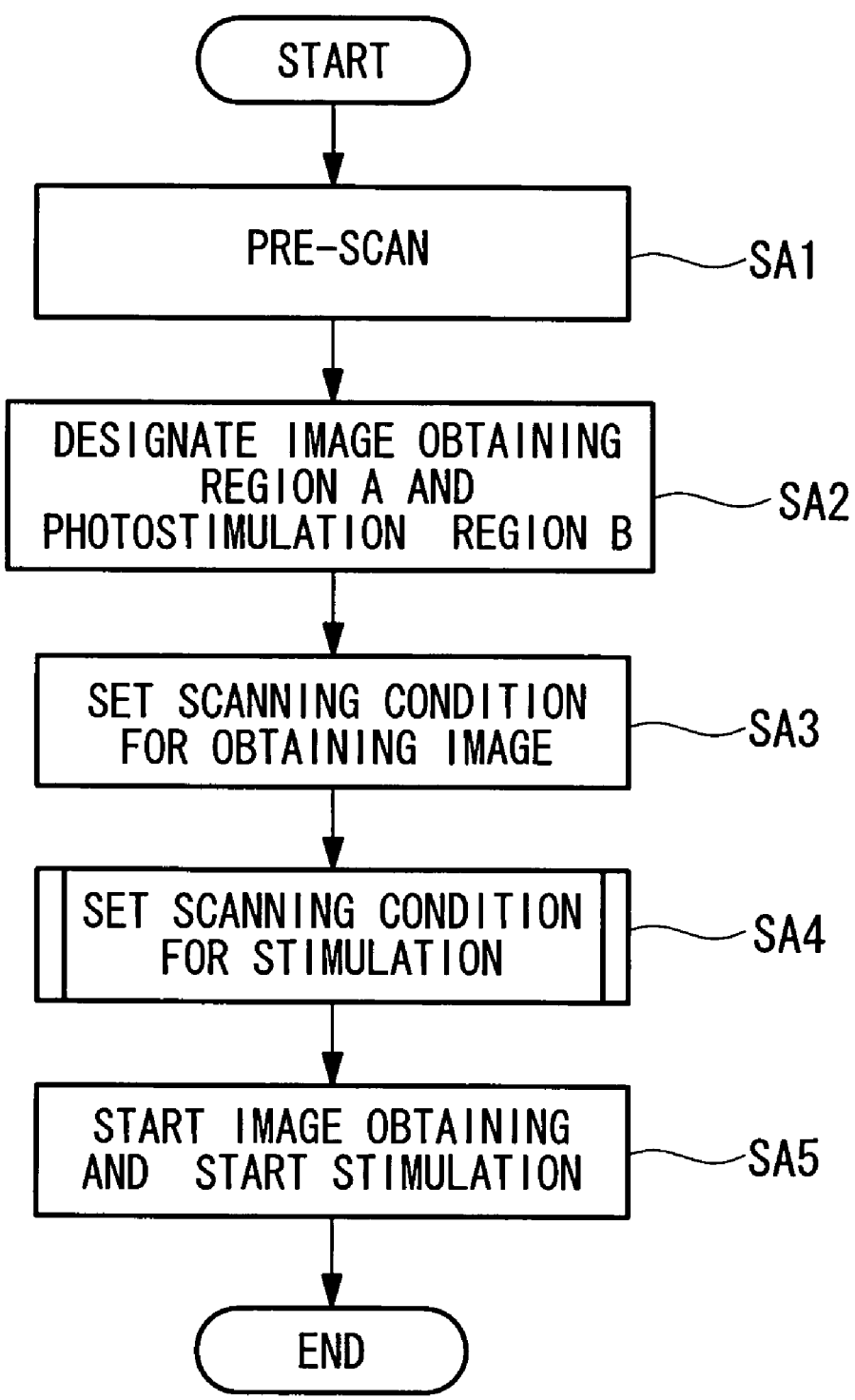
FIG. 4 is a flowchart showing one example of a processing sequence of the laser scanning microscope according to the first embodiment of the present invention.

First, as the pre-step of experiment start, pre-scanning is performed (in step SA1 in FIG. 4). In the pre-scanning, the CPU 22 operates the scanning optical system 2 for observation and the optical detector 6, thereby displaying the fluorescent image of the sample P on the display device 24. Specifically, the CPU 22 operates the laser beam source 8 for observation and the first scanner 9. As a consequence, the first scanner 9 two-dimensionally scans the sample P with the laser beam L1 for observation emitted from the laser beam source 8 for observation, and the laser beam L1 for observation is emitted to the sample P via the dichroic mirror 4 and the objective lens 5. When the laser beam L1 for observation is emitted to the sample P, a fluorescent material existing within the sample P is excited by the laser beam L1 for observation, and the fluorescent light F is generated. The fluorescent light F generated in the sample P is returned with the same passage line as that of the laser beam L1 for observation, via the objective lens 5, the dichroic mirror 4, and the first scanner 9, and the dichroic mirror 12 divides the fluorescent light from the laser beam L1 for observation, and the divided fluorescent light is guided to the optical detector 6.

With the optical detector 6, the fluorescent light F forms an image via the confocal pin hole 31, is incident on a dichroic mirror 32, and is branched into two portions in accordance with the wavelength. Fluorescent light F1 reflected by the dichroic mirror 32 is reflected by the distribution element 36 at angles varied depending on the wavelengths. The distribution element 36 is rotated in this state, thereby condensing the light in the center of the wavelengths corresponding to the rotating angle of the distribution element 36 to the slit 38 with the lens 37. Only light with the wavelength passing through the slit 38 is incident on the photoelectrically converting element 39.

On the other hand, fluorescent light F2 passing through the dichroic mirror 32 is guided to the second optical detector unit 35 with the dichroic mirror 33. With the second optical detector unit 35, light with a specific wavelength is selected and transmitted from the fluorescent light F2 by the light measurement filter 40, and is incident on the photoelectrically converting element 41.

The fluorescent light F1 and F2 incident on the photoelectrically converting elements 39 and 40 is output as electrical signals corresponding to luminances, is converted into digital signals by an A/D converter (not shown), and is sent to the control device 20.

In the control device 20, the CPU 22 forms a two-dimensional fluorescent image on the basis of the digital signals, and the resultant image is displayed on the display device 24. Thus, the display device 24 displays a fluorescent image C on the observation surface, as shown in FIG. 5.

Figure 5:
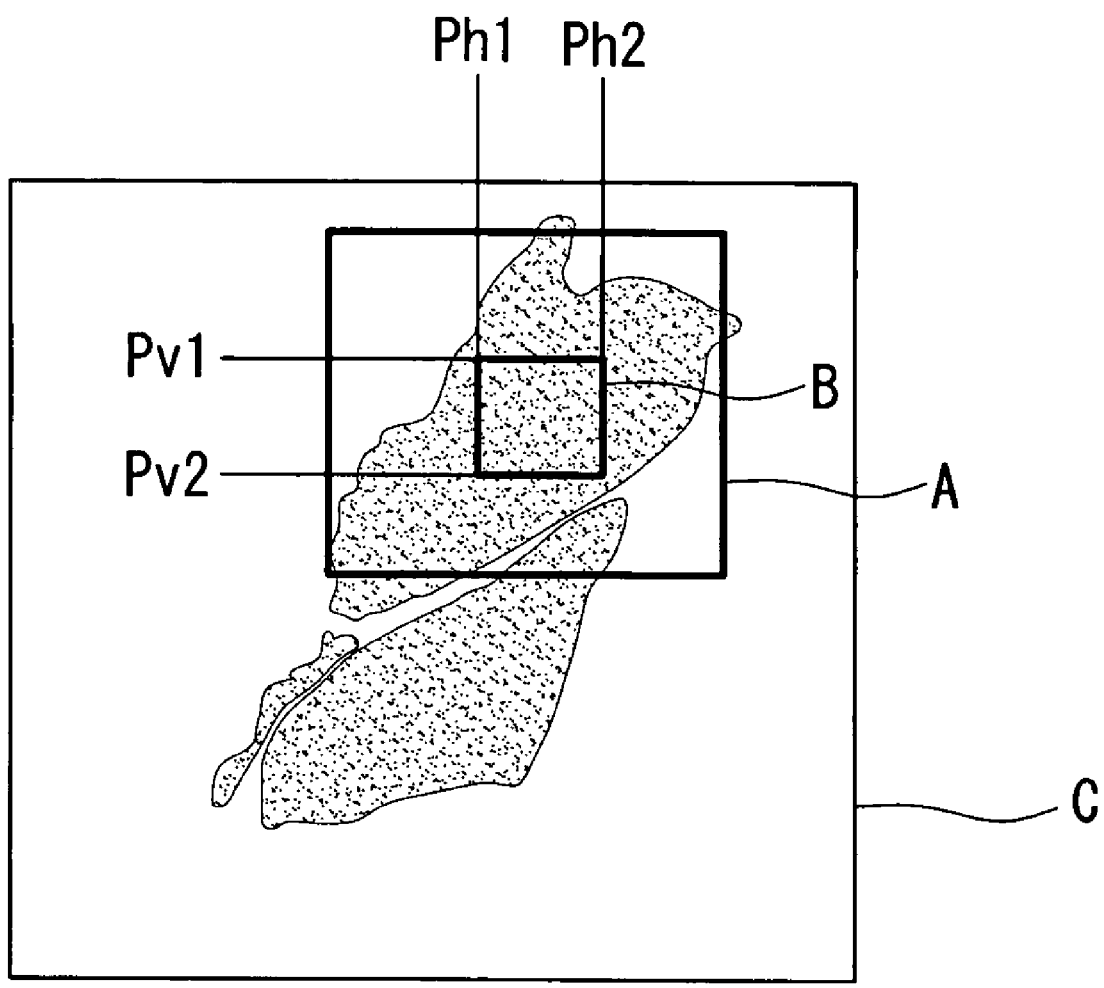
FIG. 5 is a diagram showing one example of a display screen when an image capturing region and a square photostimulation region are designated on a fluorescent image.

Subsequently, in the fluorescent image C displayed on the display device 24, the operator designates an image capturing region A and the photostimulation region B as shown in FIG. 5 (in step SA2 in FIG. 4). Then, the CPU 22 in the control device 20 sets the scanning range of the first scanner 9 in accordance with the position and range of the designated image capturing region A (in step SA3 in FIG. 4). Further, the CPU 22 calculates a frequency of the high-frequency signals applies to the vibrators 18a and 18b in accordance with the position and range of the designated photostimulation region B (in step SA4 in FIG. 4).

Hereinbelow, a detailed description will be given of setting sequence of the frequency band in step SA4 in FIG. 4 with reference to FIG. 6.

Figure 6:
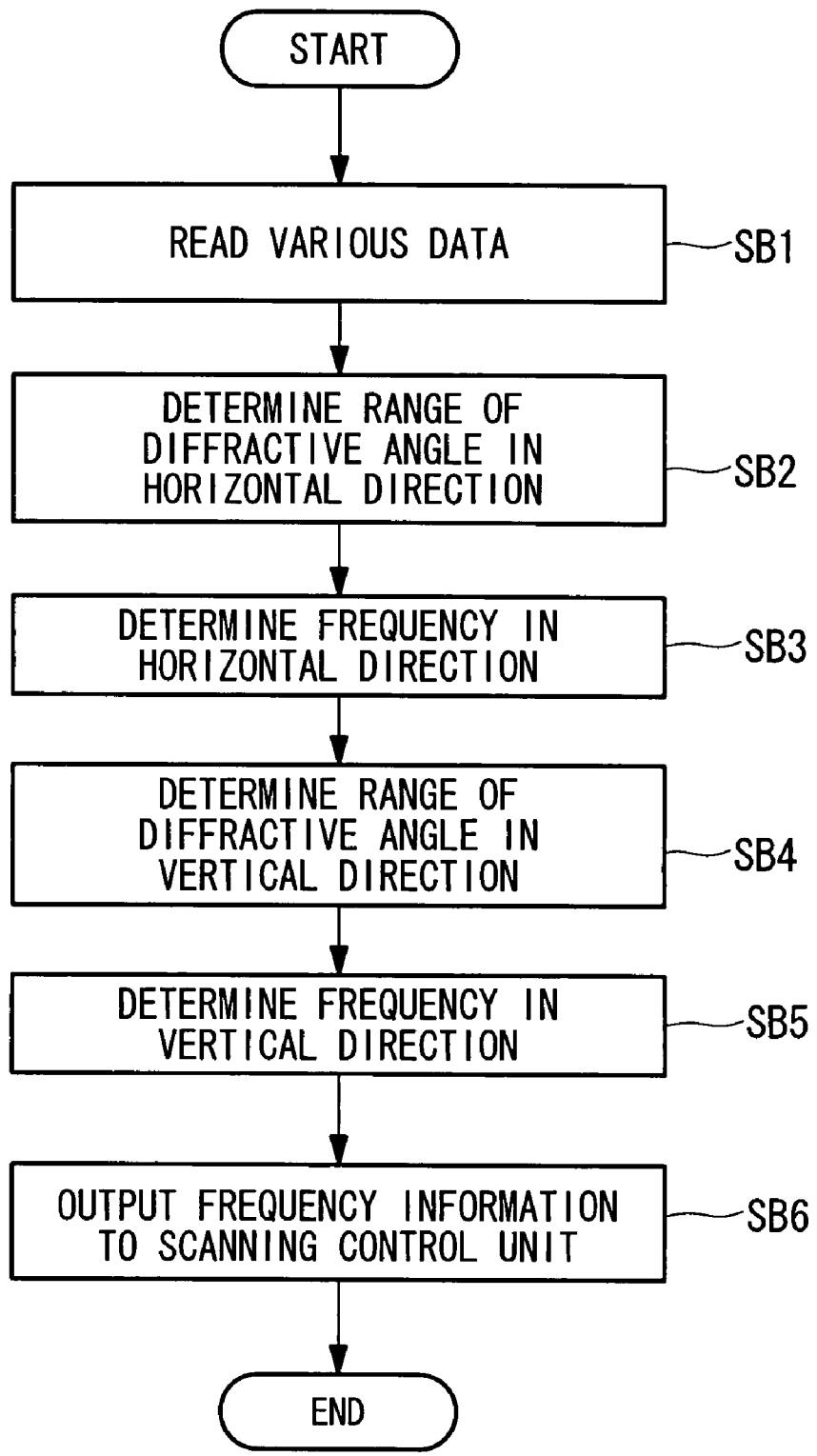
FIG. 6 is a flowchart showing one example of processing sequence for determining a frequency of a high-frequency signal in the setting of a scanning condition for simulation.

First, the CPU 22 in the control device 20 reads, from the storage unit 21 to the memory 23, the wavelength λ of the laser beam L2 for stimulation, an acoustic velocity Va1 in the crystal of the first acoustooptic device 17a, and an acoustic velocity Va2 in the crystal of the second acoustooptic device 17b (in step SB1 in FIG. 6).

Subsequently, the CPU 22 determines a diffractive-angle range θh1 to θh2 of the first acoustooptic device 17a on the basis of the position and range of the photostimulation region B in the horizontal direction (points Ph1 to Ph2 in FIG. 5) (in step SB2 in FIG. 6), and further determines a plurality of frequencies fh1 and fh2 corresponding to the diffractive-angle range θh1 to θh2 on the basis of Expression (1) (in step SB3 in FIG. 6).

For example, the frequency fh1 corresponding to the diffractive angle θh1 and the frequency fh2 corresponding to the diffractive angle θh2 are obtained as follows.

$$fh1 = \theta h1 \cdot Va1/\lambda$$

$$fh2 = \theta h2 \cdot Va1/\lambda$$

Similarly, the CPU 22 determines a diffractive-angle range θv1 to θv2 of the second acoustooptic device 17b on the basis of the position and range of the photostimulation region B in the vertical direction (points Pv1 to Pv2 in FIG. 5) (in step SB4 in FIG. 6), and further determines a plurality of frequencies fv1 to fv2 corresponding to the diffractive-angle range θv1 to θv2 on the basis of Expression (1) (in step SB5 in FIG. 6).

For example, the frequency fv1 corresponding to the diffractive angle θv1 and the frequency fv2 corresponding to the diffractive angle θv2 are obtained as follows.

$$fv1 = \theta v1 \cdot Va2/\lambda$$

$$fv2 = \theta v2 \cdot Va2/\lambda$$

As mentioned above, the CPU 22 obtains a plurality of frequencies on the basis of the position and range of the photostimulation region B, and then outputs the information to the scanning control unit 19 (in step SB6 in FIG. 6).

As mentioned above, after completing the image capturing and the preparation of the photostimulation, the CPU 22 operates the laser beam source 8 for observation and the first scanner 9 scans the scanning range, thereby two-dimensionally emitting the laser beam L1 for observation to the image capturing region A of the sample P. The thus-generated fluorescent light is detected, thereby structuring the fluorescent image within the image capturing region A and displaying the formed image on the display device 24. Further, in parallel with the image capturing, the scanning control unit 19 determines a plurality of frequencies preset within the frequency range fh1 to fh2 and the frequency range fv1 to fv2 obtained from the CPU 22 at the frequency interval, and applies the high-frequency signals having frequencies discretely distributed to the vibrators 18a and 18b (in step SA5 in FIG. 4). Incidentally, the frequency interval may be uniquely predetermined and, alternatively, one of a plurality of frequency intervals pre-registered as candidates may be selected and set by the scanning control unit 19. Alternatively, the operator may set the frequency interval from the input device 25.

Thus, the vibrators 18a and 18b are vibrated on the basis of the high-frequency signals with the frequencies, thereby propagating the vibrations to the first acoustooptic device 17a and the second acoustooptic device 17b. The index of refraction is periodically changed in acoustooptic crystal. The laser beam source 15 for stimulation is operated by the CPU 22 in this state, thereby emitting the laser beam L2 for stimulation from the laser beam source 15 for stimulation. The emitted laser beam are incident on the first acoustooptic device 17a arranged on the optical path.

The laser beam L2 for stimulation incident on the first acoustooptic device 17a is simultaneously diffracted at the diffractive angles corresponding to the frequencies of the high-frequency signals (discrete frequency values from fh1 to fh2), thereby obtaining a plurality of spot beams within the photostimulation region B in the horizontal direction, i.e., the laser beam L2 for stimulation with the one-dimensional distribution, as shown in FIG. 3. Further, the spot beams are guided to the second acoustooptic device 17b. The laser beam L2 for stimulation with the one-dimensional distribution incident on the second acoustooptic device 17b is simultaneously diffracted at the diffractive angles corresponding to the frequencies (discrete frequency values from fv1 to fv2) of the high-frequency signal. Thus, a plurality of spot beams aligned at the photostimulation region B in the vertical direction is generated. As shown in FIG. 3, the second acoustooptic device 17b emits a plurality of spot beams aligned in the horizontal and vertical directions, i.e., the laser beam L2 for stimulation with the two-dimensional distribution.

The laser beam L2 for stimulation with the two-dimensional distribution is wave-combined to the laser beam L1 for observation by the dichroic mirror 4, and are emitted to the sample P via the objective lens 5. As a consequence, it is possible to simultaneously perform the photostimulation throughout the entire region B for stimulation. The CPU 22 executes the photostimulation for the designated photostimulation time, and then ends the photostimulation. Further, even during the photostimulation, the CPU 22 continuously operates the first scanner 9 in the scanning optical system 2 for observation, thereby obtaining the fluorescent images before/ after the photostimulation, thereby continuously displaying the images on the display device 24.

Photostimulation Region; Ellipse

Figure 7:
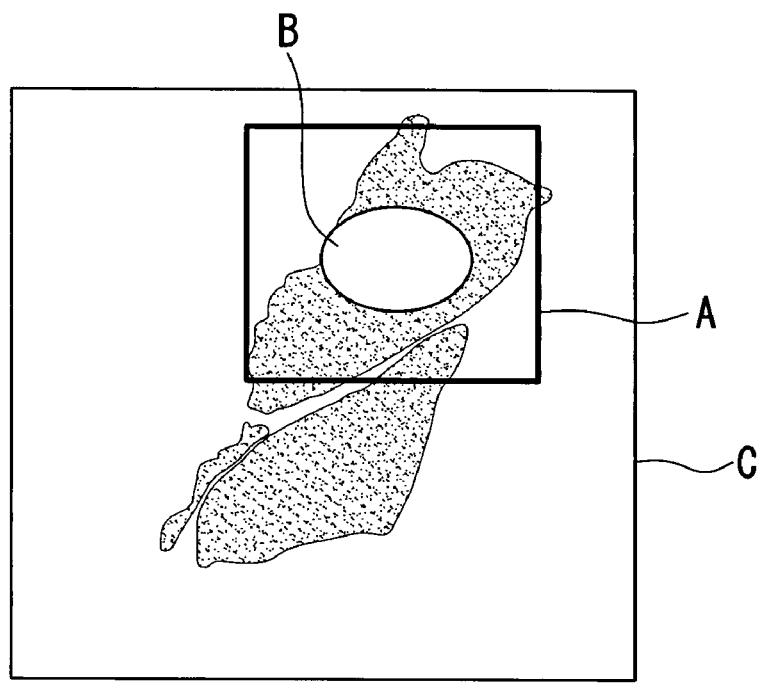
FIG. 7 is a diagram showing one example of a display screen the image capturing region and an elliptical photostimulation region are designated on the fluorescent image.

Next, a description will be given of a setting sequence of the frequency of the high-frequency signal in the case designating an ellipse as the photostimulation region B in step SA2 in FIG. 4 with reference to FIG. 7. Incidentally, upon setting the ellipse as the photostimulation region B, it is not possible to simultaneously emit the laser beam to the entire region like a square as mentioned above. Then, in the case of the ellipse as the photostimulation region B, the scanning is performed with the laser beam L2 for stimulation with the one-dimensional distribution, changing the emission range in accordance with the time, and the laser beam L2 is emitted to the entire elliptical photostimulation region B. According to the first embodiment, the first acoustooptic device 17a is used as an optical unit for scanning, and the second acoustooptic device 17b converts the laser beam L2 for stimulation as spot beams into a plurality of spot beams aligned in the vertical direction. Further, the distance between the ends of the plurality of spot beams is changed in accordance with the time. Incidentally, in the following description, the width from the minimum frequency to the maximum frequency of a plurality of frequencies is defined as a "frequency band".

First, the CPU 22 in the control device 20 reads a wavelength λ of the laser beam L2 for stimulation, the acoustic velocity Va1 in the crystal in the first acoustooptic device 17a, and the acoustic velocity Va2 in the crystal in the second acoustooptic device 17b from the storage unit 21 to the memory 23.

Subsequently, the CPU 22 determines time Tw required for stimulating the entire photostimulation region B, i.e., photostimulation time Tw from the start to the end of photostimulation of the photostimulation region B, and obtains a diffractive angle θh(tk) of the first acoustooptic device at arbitrary time tk for the photostimulation time Tw. The time tk is changed for iota time Δt from the start time t0 to the end time tw of the photostimulation, thereby obtaining the diffractive angle θh (tk: k=0, . . . , w) of the first acoustooptic device 17a within the photostimulation time Tw every iota time Δt.

Subsequently, frequency bands fh(t0), . . . , fh(tw) of the high-frequency signal corresponding to the range θh(t0), . . . , θh(tw) of the diffractive angle obtained every iota time Δt are determined on the basis of Expression (1).

For example, the frequency band of the high-frequency signal fh(tk) corresponding to the diffractive angle θh(tk) at time tk is obtained as follows.

$$fh(tk) = \theta h(tk) \cdot Va1/\lambda$$

Figure 8:
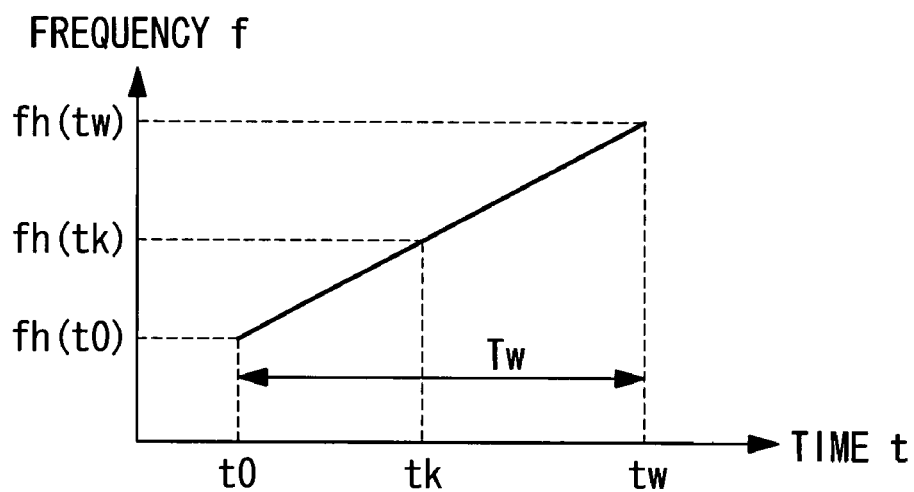
FIG. 8 is a diagram showing a relationship between time and a frequency of a high-frequency signal applied to a first vibrator, upon designating the elliptical photostimulation region.

As a result, referring to FIG. 8, the high-frequency signal that discretely increases the frequency fh(t0) to the frequency fh(tw) in proportional to the frequency is applied.

Subsequently, the CPU 22 obtains a diffractive angle range θh1(tk) to θh2(tk) of the second acoustooptic device at arbitrary time tk for the photostimulation time Tw on the basis of the position and range of the photostimulation region B in the vertical direction, the time tk is changed every iota time Δt from the start time t0 to the end time tw of the photostimulation, thereby obtaining diffractive angle ranges θv1(t0) to θv2(t0), ·θv1(tk) to θv2(tk) . . . , and θv1(tw) to θv2(tw) of the diffractive angle of the second acoustooptic device every iota time Δt for the photostimulation time Tw.

Subsequently, frequency bands fv1(t0) to fv2(t0), . . . , fv1(tw) to fv2(tw) of the high-frequency signals corresponding to the diffractive angle ranges of θv1(t0) to θv2 (t0) (herein, θv1(t0)=θv2(t0)), θv1(tk) to θv2(tk), and θv1(tw) to θv2(tw) (herein, θv1(tw)=θv2(tw)) obtained every iota time Δt are obtained on the basis of Expression (1).

For example, the frequency band fv1(tk) to fv2(tk) of the high-frequency signals corresponding to the diffractive angle range θv1(tk) to θv2(tk) at the time tk is obtained as follows.

$$fv1(tk) = \theta v1(tk) \cdot Va2/\lambda$$

$$fv2(tk) = \theta v2(tk) \cdot Va2/\lambda$$

Figure 9:
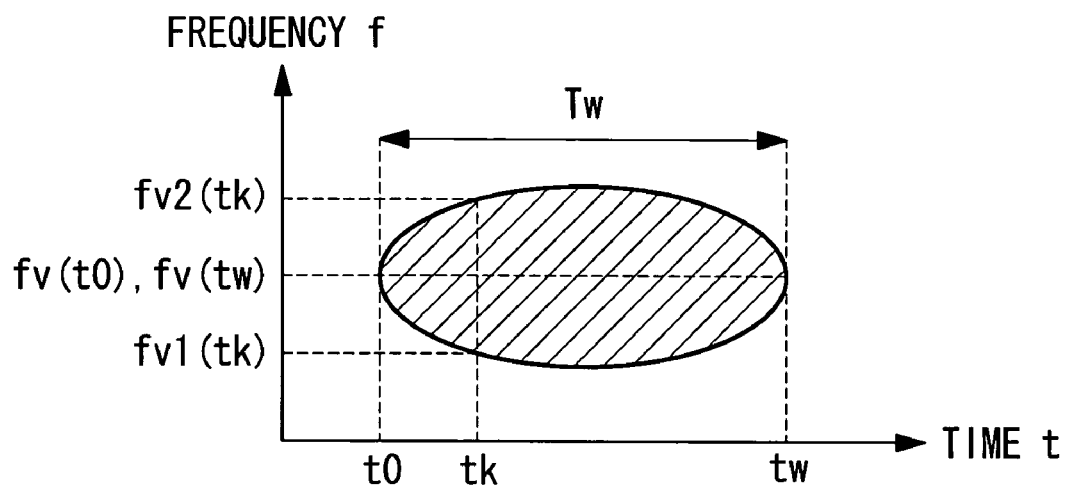
FIG. 9 is a diagram showing a relationship between time and a frequency of a high-frequency signal applied to a second vibrator, upon designating the elliptical photostimulation region.

As a consequence, referring to FIG. 9, the high-frequency signals having the frequency band changing with time is applied.

As mentioned above, the CPU 22 obtains the frequency band of the high-frequency signals supplied to the vibrators 18a and 18b on the basis of the position and range of the photostimulation region B, and outputs the frequency information to the scanning control unit 19.

Thus, upon executing the above-mentioned photostimulation, the high-frequency signal based on the frequency information is applied to the vibrators 18a and 18b, and the index of refraction is changed in the acoustooptic crystal of the first and second acoustooptic devices 17a and 17b in accordance with the high-frequency signals. The laser beam L2 for stimulation emitted from the laser beam source 15 for stimulation is incident on the first acoustooptic device 17a, is diffracted by an angle corresponding to the frequency on the fluorescent image in the horizontal direction, and is incident on the second acoustooptic device 17b. In the second acoustooptic device 17b, the laser beam L2 is simultaneously diffracted within the range of the frequency band fv1(tk) to fv2(tk), thereby generating a plurality of spot beams aligned in the vertical direction of the fluorescent image. In other words, the laser beam L2 is converted into the laser beam L2 for stimulation with the one-dimensional distribution.

The laser beam L2 for stimulation with the one-dimensional distribution is wave-combined to the laser beam L1 for observation by the dichroic mirror 4, and are emitted to the sample P via the objective lens 5. Then, the frequency and frequency band of the high-frequency signal applied to the first and second vibrators 18a and 18b are changed in accordance with the time, thereby scanning the sample P in the horizontal direction with the laser beam L2 for stimulation with the one-dimensional distribution, which change the length in the vertical direction with time. As a consequence, the laser beam L2 for stimulation is emitted to the entire elliptical photostimulation region B as shown in FIG. 7.

Photostimulation Region; Line

Next, a description will be given of setting sequence of the frequency of the high-frequency signal in the case of designating a line, as the photostimulation region B, in the horizontal direction of the fluorescent image in step SA2 with reference to FIG. 10.

First, the CPU 22 in the control device 20 reads the wavelength λ of the laser beam L2 for stimulation, the acoustic velocity Va1 in the crystal of the first acoustooptic device 17a, and the acoustic velocity Va2 in the crystal of the second acoustooptic device 17b, from the storage unit 21 to the memory 23.

Subsequently, the CPU 22 determines a diffractive angle range θh1 to θh2 of the first acoustooptic device 17a on the basis of the position and range of the photostimulation region B in the horizontal direction (points Ph1 to Ph2 in FIG. 5), and further determines a frequency band fh1 to fh2 of the high-frequency signals corresponding to the diffractive angle range θh1 to θh2 on the basis of Expression (1).

For example, the frequency fh1 corresponding to the diffractive angle θh1 and the frequency fh2 corresponding to the diffractive angle θh2 are obtained as follows.

$$fh1 = \theta h1 \cdot Va1/\lambda$$

$$fh2 = \theta h2 \cdot Va1/\lambda$$

Similarly, the CPU 22 determines the diffractive angle θv of the second acoustooptic device 17b on the basis of the position of the photostimulation region B in the vertical direction, and further determines the frequency band of the high-frequency signal fv corresponding to the diffractive angle θv on the basis of Expression (1).

For example, the frequency fv corresponding to the diffractive angle θv is obtained as follows.

$$fv = \theta v \cdot Va2/\lambda$$

As mentioned above, the CPU 22 obtains the frequency band of the high-frequency signals supplied to the vibrators 18a and 18b on the basis of the photostimulation region B, and outputs the information to the scanning control unit 19.

As a consequence, upon executing the above-mentioned photostimulation, the high-frequency signals of the frequencies based on the frequency information are applied to the vibrators 18a and 18b, and the index of refraction is changed in the acoustooptic crystal of the first and second acoustooptic devices 17a and 17b in accordance with the high-frequency signals. The laser beam L2 for stimulation emitted from the laser beam source 15 for stimulation is incident on the first acoustooptic device 17a, thereby simultaneously diffracting the laser beam L2 on the fluorescent image in the horizontal direction by an angle corresponding to the frequency. Further, the laser beam L2 is converted into the laser beam L2 with the one-dimensional distribution, and is incident on the second acoustooptic device 17b. The second acoustooptic device 17b diffracts the laser beam L2 within frequency band fv, thereby adjusting the position of the fluorescent image in the vertical direction. The position-adjusted laser beam L2 for stimulation with the one-dimensional distribution is wave-combined to the laser beam L1 for observation by the dichroic mirror 4, and are emitted to the sample P via the objective lens 5.

Figure 10:
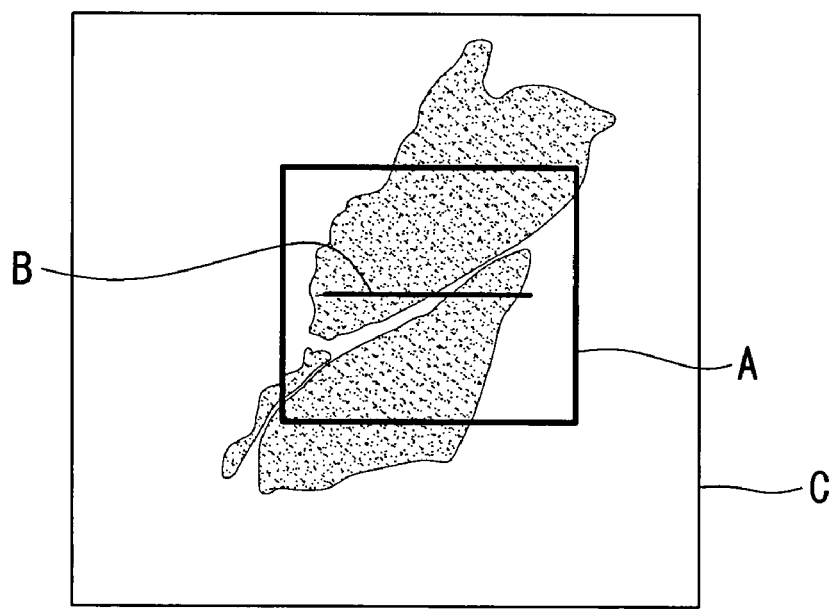
FIG. 10 is a diagram showing one example of a display screen when the image capturing region and the elliptical photostimulation region are designated on the fluorescent image.

As a consequence, the laser beam L2 for stimulation is simultaneously emitted as a plurality of spot beams to the entire linear photostimulation region as shown in FIG. 10.

As mentioned above, in the laser scanning microscope 1 according to the first embodiment, the scanning optical system 3 for stimulation comprises the first acoustooptic device 17a that diffracts the incident laser beam L2 for stimulation in the horizontal direction, and the second acoustooptic device 17b that diffracts the incident laser beam L2 for stimulation in the vertical direction. Therefore, the laser beam L2 for stimulation with the two-dimensional distribution can be emitted to the sample P. Thus, the photostimulation can be simultaneously executed to the entire the photostimulation region B. As a consequence, the photostimulation execution time from the start to the end of photostimulation can be reduced. Further, the frequency interval of the high-frequency signals applied to the vibrators 18a and 18b are narrowed, thereby further finely emitting the laser beam.

In addition, when the photostimulation region B is set to be circular or elliptical, one of the first and second acoustooptic devices 17a and 17b is used as an optical unit for scanning, and the scanning is performed with the laser beam L2 for stimulation with the one-dimensional distribution, thereby executing the photostimulation to the entire circular or elliptical photostimulation region B. As mentioned above, even in the scanning with the laser beam L2 for stimulation with the one-dimensional distribution, the scanning is performed with the laser beam L2 for stimulation by using the acoustooptical effect, thereby reducing the scanning time as compared with the scanning with the laser beam L2 for stimulation by using the galvanic mirror.

A corresponding relationship between characteristics of the diffractive angles of the acoustooptic devices 17a and 17b, i.e., the frequency of the high-frequency signal and the diffractive angle θ of the laser beam L2 for stimulation emitted from the acoustooptic devices 17a and 17b is varied depending on the wavelength of the laser beam L2 for stimulation. Therefore, the wavelength of the laser beam L2 for stimulation is correlated with characteristics of the diffractive angle of the acoustooptic device, and the resultant corresponding relationship is pre-stored in the storage unit 21 in the control device 20. Further, the characteristics of the diffractive angle corresponding to the wavelength of the laser beam L2 for stimulation may be referred to every time, and the CPU 22 may determine the frequency range of the high-frequency signal. As mentioned above, the wavelength of the laser beam L2 for stimulation is correlated with the characteristics of the diffractive angles of the acoustooptic devices 17a and 17b and is stored in the storage unit 21. As a consequence, even if switching the wavelength of the laser beam L2 for stimulation, the laser beam L2 for stimulation can be emitted to the same position.

Further, according to the first embodiment, the description is given of the case in which the photostimulation region B is square, circular, and linear. However, upon designating the photostimulation region B such as a curve or a collection of a plurality of points, the CPU 22 also determines the frequency or frequency band applied to the vibrators 18a and 18b in accordance with the position and range of the photostimulation region B, thereby similarly executing the photostimulation of the photostimulation region B.

Furthermore, according to the first embodiment, the description is given of the case of simultaneously operating the scanning optical system 2 for observation and the scanning optical system 3 for stimulation. However, the present invention is not limited to this and, for example, during operating the scanning optical system 3 for stimulation, the scanning optical system 2 for observation may be stopped.

In addition, according to the first embodiment, the acoustooptic polariscope is used as an acoustooptic device. However, the present invention is not limited to this and, for example, another acoustooptic device such as an acoustooptic modulator may be used.

In addition, according to the first embodiment, the scanning control unit 19 determines the frequencies within the frequency range on the basis of the frequency information sent from the CPU 22 at a predetermined frequency interval. In place of the scanning control unit 19, the CPU 22 may determine a discrete frequency within the frequency range.

According to the first embodiment, the combination of the two acoustooptic devices 17a and 17b performs the second scanning. In place of this, one of the acoustooptic devices 17a and 17b may perform the second scanning. With this structure, the laser beam L2 for stimulation with the one-dimensional distribution is emitted to the sample P.

Further, the arrangement of the acoustooptic devices 17a and 17b may be inverted.

Second Embodiment

Next, a description will be given of a laser scanning microscope according to the second embodiment of the present invention.

The laser scanning microscope according to the second embodiment is different from that according to the first embodiment in that the CPU 22 also controls the amplitude of the high-frequency signals applied to the vibrators 18a and 18b.

Hereinbelow, the common points to those according to the first embodiment with respect to the laser scanning microscope according to the second embodiment will not described, and only different points will be described.

Referring to FIG. 1, the acoustooptic devices 17a and 17b used for the second scanner 17 have the feature that the intensity of the laser beam L2 for stimulation after the diffraction, i.e., to be emitted is varied depending on the frequency band of the high-frequency signals applied to the vibrators 18a and 18b. Herein, there is a proportional relationship between the intensity of the laser beam L2 for stimulation emitted from the acoustooptic devices 17a and 17b and the amplitude of the high-frequency signal applied to the vibrators 18a and 18b. Then, according to the second embodiment, the amplitude of the high-frequency signal applied to the vibrators 18a and 18b are corrected, thereby solving the variation in intensity of the laser beam L2, caused depending on the frequency band of the high-frequency signal.

Figure 11:
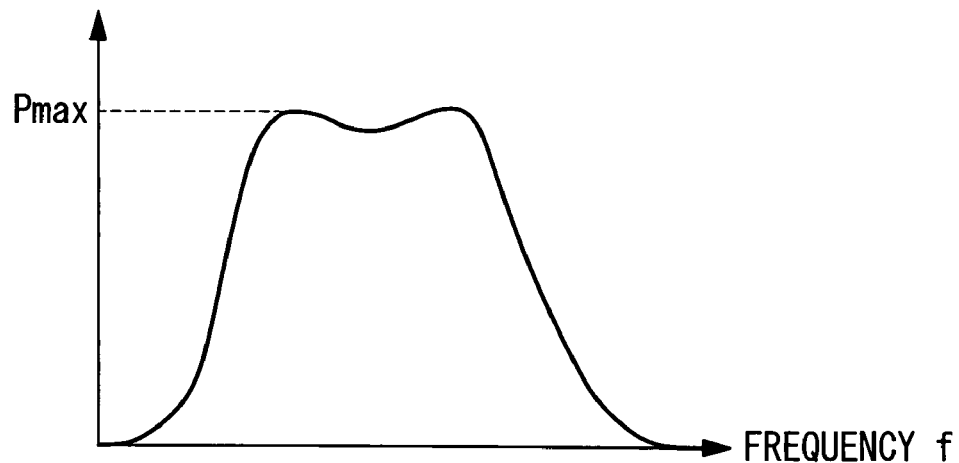
FIG. 11 is a diagram showing one example of characteristics of the intensity of diffraction light.

In the laser scanning microscope according to the second embodiment, the memory 23 stores characteristics of the intensity of diffraction light of the first and second acoustooptic devices in addition to the above-mentioned information (refer to FIG. 11).

The CPU 22 sets the frequency or frequency band of the frequency of the high-frequency signals applied to the vibrators 18a and 18b in accordance with the photostimulation region B on the similar sequence to that according to the first embodiment, thereby correcting the amplitude of the high-frequency signal in accordance with the set frequency or frequency band.

Specifically, the amplitude of the high-frequency signal is corrected by using the following Expression (2).

$$Pf' = (Pmax/Pcur) \cdot Pf \qquad (2)$$

In Expression (2), reference numeral Pf' denotes the amplitude of the high-frequency signal after the correction, reference numeral Pmax denotes the maximum intensity of laser beams after the diffraction, reference numeral Pcur denotes the intensity of laser beams having a frequency as a correction target, and reference numeral Pf denotes the amplitude of the high-frequency signal before the correction.

The CPU 22 corrects the amplitude of the high-frequency signal by using Expression (2), and outputs information on the amplitude after the correction and the set frequency information to the scanning control unit 19. As a consequence, the high-frequency signal of the corrected amplitude is applied to the vibrators 18a and 18b, and the intensity of light of the laser beam L2 for stimulation output from the first and second acoustooptic devices 17a and 17b can keep the same intensity of light, without depending on the frequency applied to the vibrator, that is, irrespectively of the diffractive angle θ of the laser beam L2 for stimulation.

As mentioned above, with the laser scanning microscope according to the second embodiment, the amplitude is corrected in accordance with the frequencies of the high-frequency signals applied to the vibrators 18a and 18b. Therefore, the intensities of the laser beam L2 for stimulation output from the first and second acoustooptic devices 17a and 17b is identical to each other without depending on the diffractive angle θ. As a consequence, the two-dimensional laser beam for stimulation having the uniform intensity can be emitted to the sample P.

According to the second embodiment, the description is given of the case of equalizing the intensities of the laser beam L2 for stimulation without depending on the diffractive angle θ of the acoustooptic devices 17a and 17b. With characteristics of the intensity of diffraction light shown in FIG. 11, the intensity of light can be controlled with intension. Specifically, upon emitting, to one part of the photostimulation region B, light stronger than that of another part, the amplitude of the high-frequency signal of the frequency of the part may be set to be high. As mentioned above, with the laser scanning microscope according to the second embodiment, it is possible to improve the precision of controlling the intensity of the laser beam L2 for stimulation emitted to the sample P.

For example, at the rectangular photostimulation region B shown in FIG. 5, when the intensity of light is changed in the horizontal direction, the amplitude of the high-frequency signal of the frequency applied to the vibrator 18a of the first acoustooptic device 17a corresponding to the horizontal direction may be changed in accordance with the position.

Figure 12:
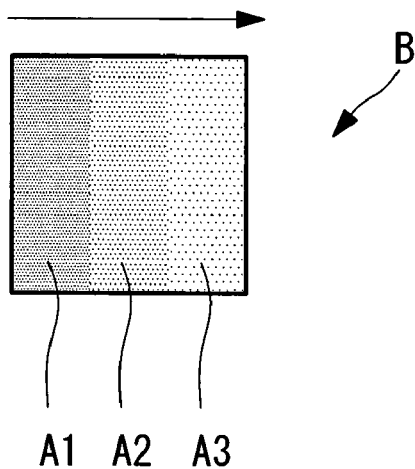
FIG. 12 is a diagram showing one example upon changing the intensity of light within the photostimulation region.
Figure 13:
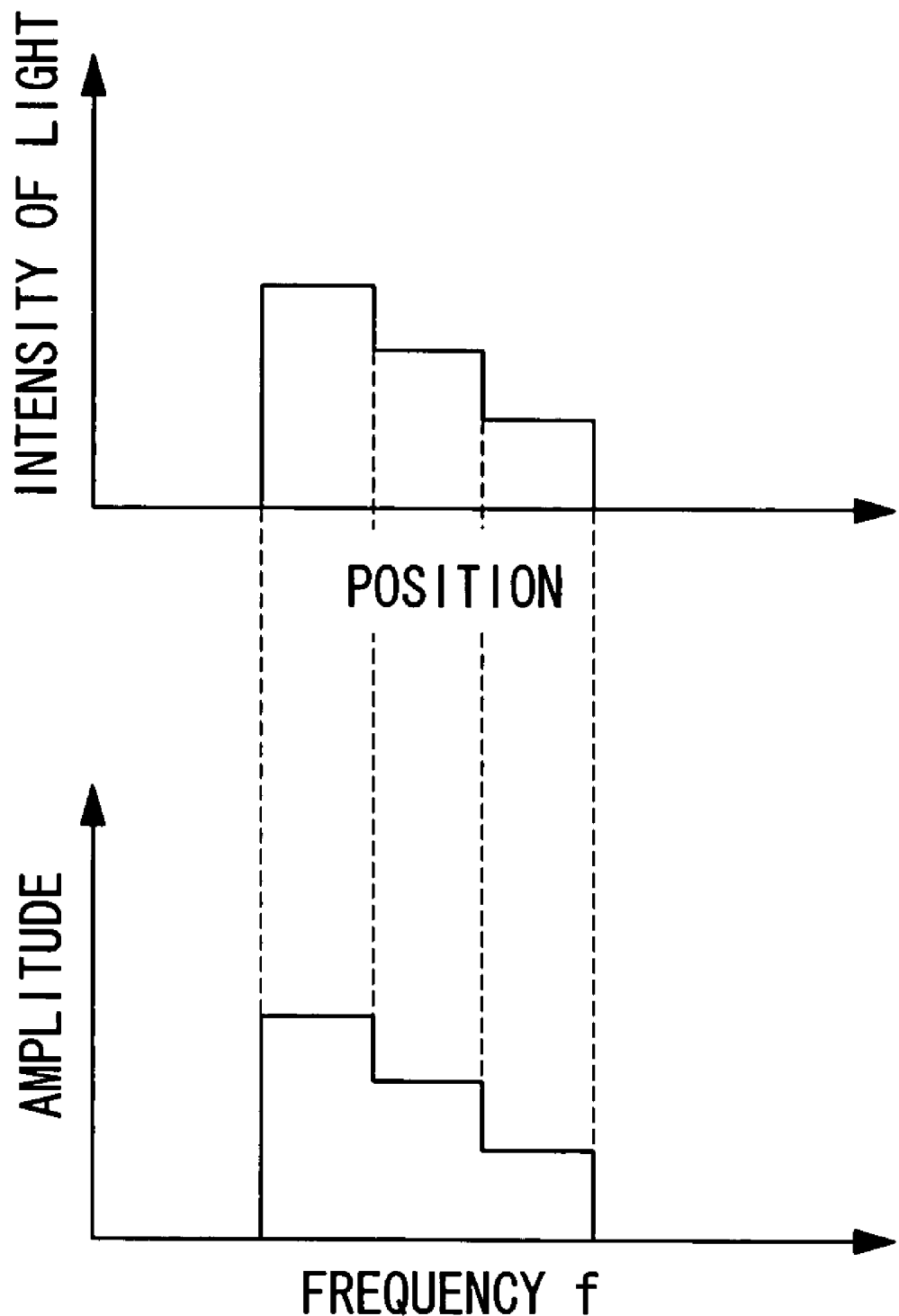
FIG. 13 is a diagram showing a relationship between a frequency applied to a first vibrator and amplitude, upon emitting laser beams for stimulation with the intensity of light shown in FIG. 12.

For example, at the photostimulation region B as shown in FIG. 12, when the intensity of light is stepwise reduced in order of a left region A1, a center region A2, and a right region A3, as shown in FIG. 13, the amplitude of the high-frequency signal of the frequency corresponding to the left region A1 may be the highest, the amplitude of the high-frequency signal of the frequency corresponding to the center region A2 may be intermediate, and the amplitude of the high-frequency signal of the frequency corresponding to the right region A3 may be the lowest. Herein, the description is given of the case of changing the intensity of light in the horizontal direction. Similarly, the amplitude of the high-frequency signal applied to the second vibrator 18b corresponding to the second acoustooptic device 17b is varied depending on the frequency, and the intensity of light can be thus two-dimensionally changed. As a consequence, the intensity can be finely controlled.

Figure 14:
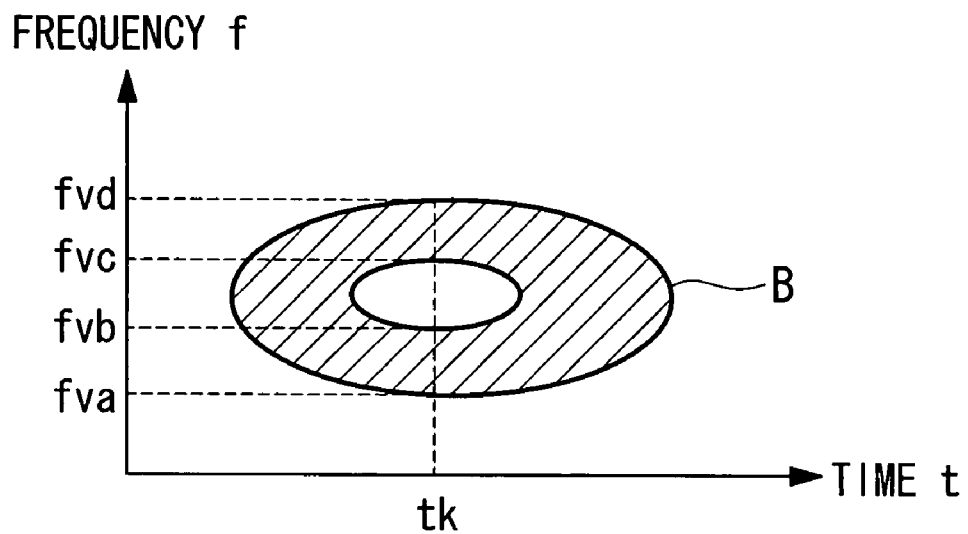
FIG. 14 is a diagram showing a doughnut-shaped photostimulation region.
Figure 15:
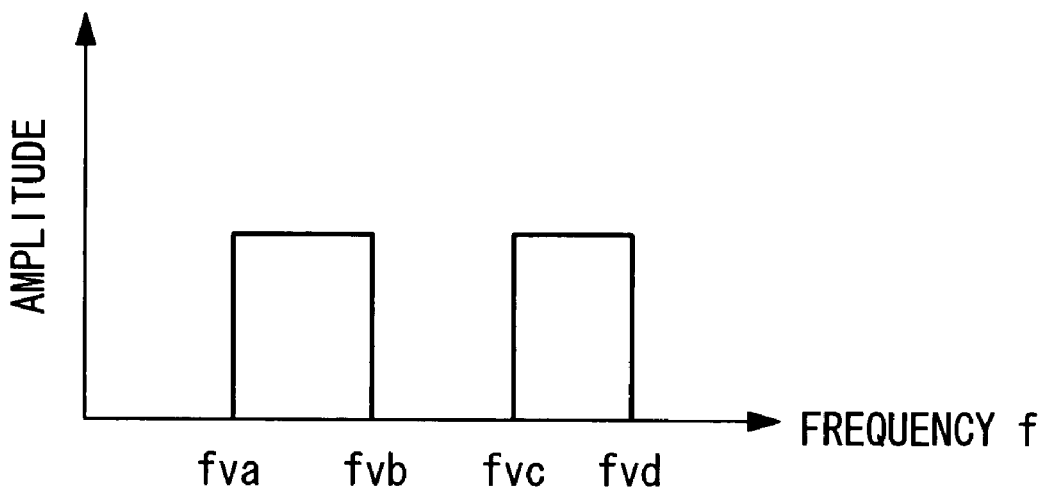
FIG. 15 is a diagram showing a relationship between a frequency of a high-frequency signal applied to a second vibrator and amplitude at time tk for designating the doughnut-shaped photostimulation region shown in FIG. 14.

Further, as shown in FIG. 14, when the laser beam L2 for stimulation is not emitted to the center portion of the elliptical photostimulation region B, that is, when the laser beam L2 for stimulation is emitted to a doughnut-shaped photostimulation region B with the second acoustooptic device 17b, by setting, to zero, the amplitude of the frequency band corresponding to a region to which the photostimulation is not to be executed, the emission of the laser beam L2 can be prevented. For example, as shown in FIG. 15, at time tk, at a frequency band from fva to fvd, the intensity of light at a frequency band from fvb to fvc is set to zero. Thus, it is possible to prevent the emission of the laser beam L2 for stimulation to a region corresponding to the frequency band from fvb to fvc. Further, by changing the frequency band to set the amplitude to zero in accordance with the time, it is possible to perform the photostimulation to the doughnut-shaped photostimulation region B shown in FIG. 14.

As mentioned above, the amplitude of the high-frequency signal is controlled, thereby adjusting the intensity of light at the position. As a consequence, it is possible to embody the photostimulation region B having various shapes as well as the doughnut-shaped photostimulation region B shown in FIG. 14. Thus, even if a subject such as a living cell is a non-geometrical, the photostimulation can be performed corresponding to the shape. For example, at the entire one cell such as nervus, the photostimulation can be performed excluding the cell nucleus.

Third Embodiment

Next, a description will be given of a laser scanning microscope according to the third embodiment of the present invention.

Figure 16:
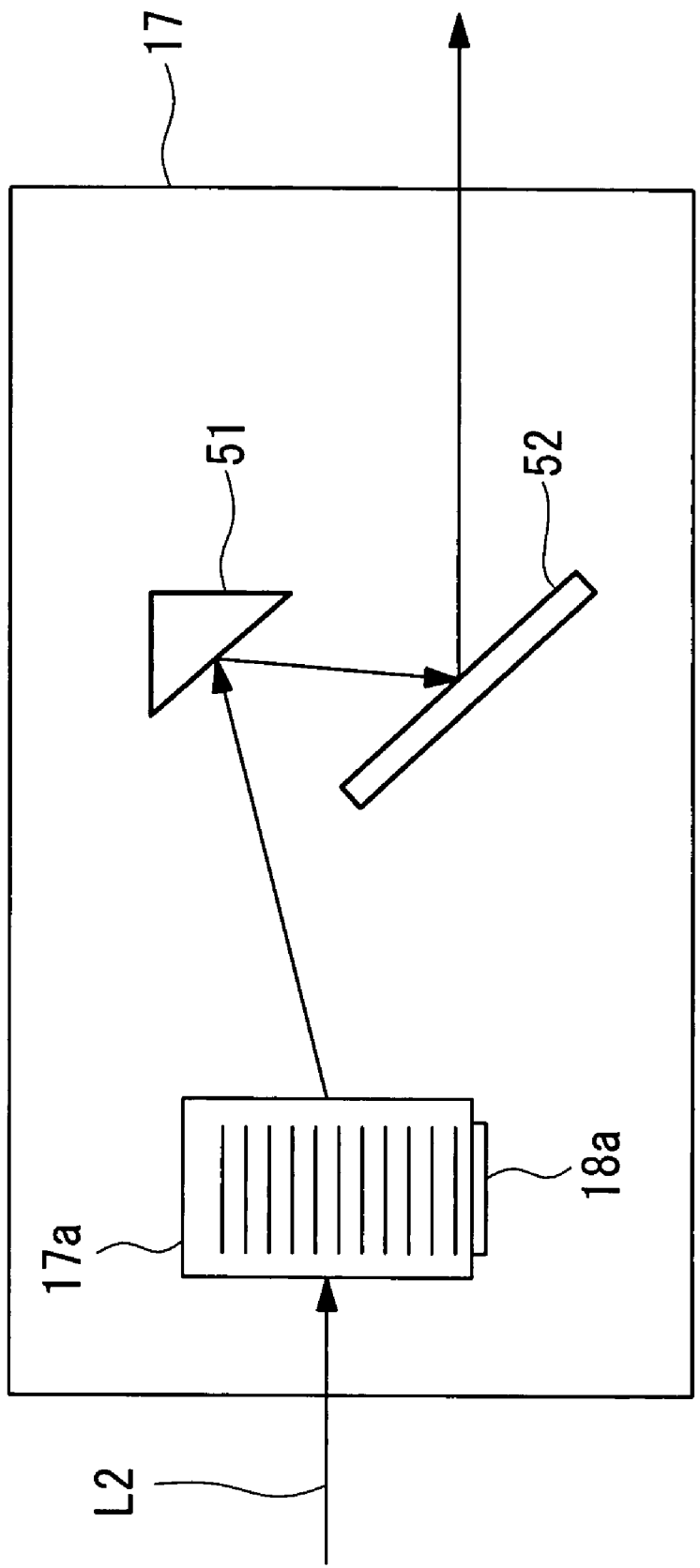
FIG. 16 is a diagram showing one example of the structure of a second scanner in a laser scanning microscope according to the third embodiment of the present invention.

Unlike the laser scanning microscope 1 according to the first embodiment, a laser scanning microscope according to the third embodiment has a galvanic mirror 51 that is mechanically vibrated for light deflection as shown in FIG. 16, in place of the second acoustooptic device 17b.

The galvanic mirror 51 scans the fluorescent image in the vertical direction with the laser beam L2 for stimulation that position-adjusts the fluorescent image in the horizontal direction with the first acoustooptic device 17a.

For example, with the laser scanning microscope, the laser beam L2 for stimulation emitted from the laser beam source 15 for stimulation are set as the laser beam L2 for stimulation with the one-dimensional distribution in the horizontal direction by the first acoustooptic device 17a, and are guided to the galvanic mirror 51. The galvanic mirror 51 scans the image in the vertical direction with the laser beam L2 for stimulation having the one-dimensional distribution, and the laser beam L2 is guided to the dichroic mirror 4 via a mirror 52, the resultant laser beam L2 is wave-combined to the laser beam L1 for observation, and the combined laser beams are emitted to the sample P via the objective lens 5. Thus, the scanning is performed with the laser beam L2 for stimulation with the one-dimensional distribution in the horizontal direction, thereby efficiently executing the photostimulation to a desired photostimulation region B.

Incidentally, according to the third embodiment, the arrangement of the galvanic mirror 51 and the first acoustooptic device 17a may be exchanged. Alternatively, the arrangement of the galvanic mirror 51 and the mirror 52 may be exchanged. Further, the second scanner 17 may be structured by combining the second acoustooptic device 17b and the galvanic mirror 51.

The embodiments of the present invention are described with reference to the drawings. However, the specific structure is not limited to the embodiments, and the present invention includes change in design without departing the essentials of the present invention.

What is claimed is:

1. A laser scanning microscope that emits a laser beam for observation for observing a sample placed on a stage in a manner such that the laser beam two-dimensionally scans the sample, detects the light emitted from the sample, and forms a fluorescent image, the laser scanning microscope comprising:
    a laser beam source for stimulation that emits a laser beam for stimulation for supplying photostimulation to the sample;
    a scanning unit for stimulation that performs scanning with the laser beam for stimulation;
    a control unit that controls the scanning unit for stimulation in response to a position and range of a region for photostimulation; and
    an objective lens that condenses the laser beam for stimulation used for scanning by the scanning unit for stimulation and emits the laser beam to the sample,
    wherein the scanning unit for stimulation comprises at least one acoustooptic device arranged on an optical path of the laser beam for stimulation, and
    wherein the control unit is adapted to determine a plurality of frequencies and to simultaneously apply high-frequency signals of the determined plurality of frequencies to a vibrator attached to the acoustooptic device, thereby causing the laser beam to be simultaneously deflected in a plurality of diffractive angles.

2. The laser scanning microscope according to claim 1, wherein the scanning unit for stimulation comprises:
    a first acoustooptic device that diffracts the incident laser beams for stimulation in a first direction; and
    a second acoustooptic device that diffracts the incident laser beams for stimulation in a direction intersecting with the first direction.

3. The laser scanning microscope according to claim 2, wherein high-frequency signals of a plurality of frequencies are simultaneously applied to the vibrators of the first acoustooptic device and the second acoustooptic device, thereby simultaneously emitting the laser beam for stimulation to a two-dimensional region on the sample.

4. The laser scanning microscope according to claim 3, wherein the two-dimensional region to which the laser beam for stimulation are emitted is rectangular.

5. The laser scanning microscope according to claim 2, wherein high-frequency signals of a plurality of frequencies are simultaneously applied to one of the vibrators of the first acoustooptic device and the second acoustooptic device, thereby simultaneously emitting the laser beam for stimulation to a region on a line on the sample.

6. The laser scanning microscope according to claim 5, wherein the region on the line to which the laser beam for stimulation are emitted has a line segment with a predetermined length.

7. The laser scanning microscope according to claim 2, wherein high-frequency signals of a plurality of frequencies are simultaneously applied to one of the vibrators of the first acoustooptic device and the second acoustooptic device, a high-frequency signal of at least one frequency that changes with time is applied to the other vibrator to switch a substantially line shaped emission region of light emitted from the one of the first and second acoustooptic device driven by the one vibrator to the other one of the first and second acoustooptic device driven by the other vibrator, thereby emitting laser beams for stimulation to a two-dimensional region on the sample.

8. The laser scanning microscope according to claim 7, wherein the frequency of the high-frequency signal applied to the one vibrator changes with time.

9. The laser scanning microscope according to claim 8, wherein the two-dimensional region on the sample to which the laser beam for stimulation is emitted is circular.

10. The laser scanning microscope according to claim 1, wherein the at least one acoustooptic device of the scanning unit for stimulation diffracts the incident laser beam for stimulation in a horizontal direction or in a vertical direction; and wherein the scanning unit for stimulation further comprises a scanning mirror that performs scanning in a direction substantially intersecting with the diffraction direction of the acoustooptic device with the incident laser beam for stimulation.

11. The laser scanning microscope according to claim 10, wherein high-frequency signals of a plurality of frequencies are simultaneously applied to the vibrator of the acoustooptic device, thereby simultaneously emitting a laser beam for stimulation to a substantially line shaped region on the sample.

12. The laser scanning microscope according to claim 11, wherein the substantially line shaped region comprises a line segment with a predetermined length.

13. The laser scanning microscope according to claim 10, wherein high-frequency signals of a plurality of frequencies are simultaneously applied to the vibrator of the acoustooptic device and the scanning mirror scans emission positions at the substantially line shaped region to which the acoustooptic device simultaneously emits the laser beam, thereby emitting a two-dimensional region on the sample with the laser beam for stimulation.

14. The laser scanning microscope according to claim 13, wherein the frequency of the high-frequency signal applied to the vibrator changes with time.

15. The laser scanning microscope according to claim 14, wherein the two-dimensional region on the sample to which the laser beam for stimulation is emitted is circular.

16. The laser scanning microscope according to claim 1, wherein the control unit determines the frequency of the high-frequency signal in consideration of a wavelength of the laser beam for stimulation.

17. The laser scanning microscope according to claim 1, wherein the control unit corrects an amplitude of the high-frequency signal in accordance with characteristics of diffraction light of the acoustooptic device, the characteristics being indicative of a relationship between a frequency and intensity of laser beams after diffraction.

18. The laser scanning microscope according to claim 1, further comprising:

an additional scanning unit that scans the sample with a laser beam for observation.

19. The laser scanning microscope according to claim 1, wherein the region to which the laser beam for stimulation is emitted is designatable on an image previously-obtained by the emission of the laser beam for observation.

20. The laser scanning microscope according to claim 1, wherein an interval of a plurality of frequencies of the high-frequency signals is narrower than a predetermined value, thereby spatially continuing the region for simultaneously emitting the laser beam for stimulation.

21. The laser scanning microscope according to claim 1, wherein the control unit simultaneously applies high-frequency signals having different amplitudes depending on the determined plurality of frequencies to the vibrator, thereby differing the emission intensity of the laser beam for every stimulation region.

22. The laser scanning microscope according to claim 1, wherein each of high-frequency signals of a plurality of frequencies which are simultaneously applied to the respective vibrators of the acoustooptic device is in a same direction.

23. A microscopic observing method for emitting a laser beam for observation for observing a sample placed on a stage in a manner such that the laser beam two-dimensionally scans the sample, detecting the light emitted from the sample, and forming a fluorescent image, the microscopic observing method comprising:

arranging at least one acoustooptic device on an optical path of laser beams for stimulation; and simultaneously applying high-frequency signals of a plurality of frequencies determined depending on a position and a range of a photostimulation region to a vibrator attached to the acoustooptic device, thereby causing the laser beam to be simultaneously deflected in a plurality of diffractive angles.

24. A computer-readable storage medium storing a photostimulation control program for controlling a laser scanning microscope having a scanning optical system for observation that two-dimensionally scans a sample placed on a stage with a laser beam for observation for observing the sample and an optical detecting unit that detects light emitted from the sample, wherein the scanning optical system applies photostimulation to the sample and has at least one acoustooptic device, and wherein the photostimulation control program controls the scanning optical system to execute functions comprising:

setting a diffraction range of the acoustooptic device in accordance with a position and a range of a photostimulation region;

obtaining one or a plurality of frequencies corresponding to the diffraction range; and simultaneously applying a high-frequency signal of the one or the plurality of frequencies corresponding to the diffraction range to a vibrator attached to the acoustooptic device, thereby causing the laser beam to be simultaneously deflected in a plurality of diffractive angles.

* * * * *